(No Model.)

W. H. COOPER.
CARRIAGE PERCH IRON.

No. 296,534. Patented Apr. 8, 1884.

UNITED STATES PATENT OFFICE.

WILLIAM H. COOPER, OF NEW HAVEN, CONNECTICUT, ASSIGNOR TO M. SEWARD & SON, OF SAME PLACE.

CARRIAGE-PERCH IRON.

SPECIFICATION forming part of Letters Patent No. 296,534, dated April 8, 1884.

Application filed February 11, 1884. (No model.)

*To all whom it may concern:*

Be it known that I, WM. H. COOPER, of New Haven, in the county of New Haven and State of Connecticut, have invented a new Improvement in Carriage-Perch Irons; and I do hereby declare the following, when taken in connection with accompanying drawings and the letters of reference marked thereon, to be a full, clear, and exact description of the same, and which said drawings constitute part of this specification, and represent, in—

Figure 1:
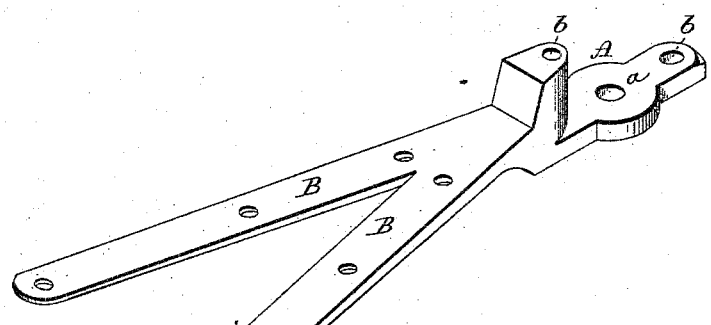
Figure 2:
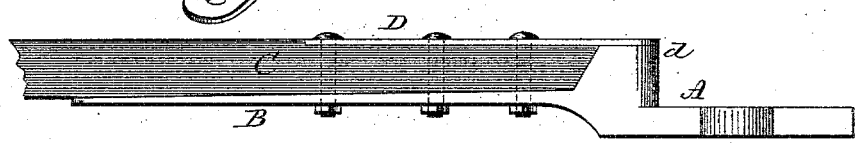
Figure 3:
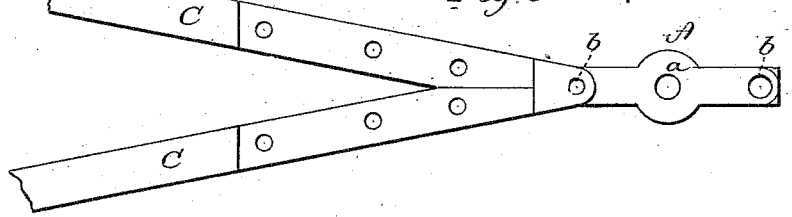
Figure 4:
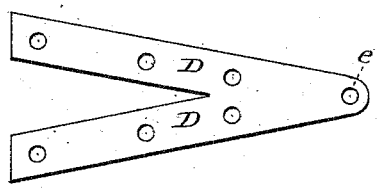

Figure 1, a perspective view; Fig. 2, a side view showing the perch applied; Fig. 3, a top side view showing the perch applied, but the upper strap removed; Fig. 4, the upper strap detached.

This invention relates to an improvement in that part of carriage-iron work called the "perch-iron," and to that particular part by which the perch is connected with the forward axle, and to the particular class in which the perch consists of two branches diverging from the front to the rear axle, and connected to the rear axle, so as to have a brace-like effect. The perch, or "reach," as it is sometimes called, is made from wood—that is, the body of the two branches is made of wood, with an iron strap extending over the upper and lower sides to a greater or less extent.

The object of my invention is the construction of the forward end of the iron, so as to receive and firmly hold the wood, and also to form a yoke for connection with the forward axle and a seat for the king-bolt; and the invention consists in the construction of the iron, as hereinafter described, and more particularly recited in the claim.

A is the yoke or bar, by which the forward end of the perch is secured, $a$ being the central or king-bolt opening, and $b\ b$ for the bolts at the front and rear.

From the rear end of the bar A straps B B diverge in a plane parallel with but above the plane of the bar, these straps B corresponding to each part C of the perch. Upon the upper side and at the rear end of the bar an upward projection, $d$, is made, corresponding in depth to the depth of the perch C, and against which the two parts abut, as seen in Fig. 3. Through this rear portion and the upward projection $d$ the opening $b$ extends for the rear bolt, and upon the upper side of the perch a V-shaped strap, as seen in Fig. 4, is applied, its two legs D D corresponding to the two straps B B on the perch-iron, and so as to lie upon the upper side of the perch, as seen in Fig. 2. The apex or forward end of the V corresponds in shape to the projection $d$, and so as to lie upon its upper surface, and is provided with a hole, $e$, corresponding to the hole $b$ through the yoke and projection $d$, and so that the bolt extends through both, and the nut applied beneath binds the forward end of the V-shaped strap to the perch-iron, and straps below and above are bolted through the perch, as indicated in Fig. 2.

This iron is forged complete as an article of manufacture, and so that carriage-makers may fit the wood perches directly to it, and when applied the ends are firmly secured together, the upward projection $d$ forming a firm shoulder against which the forward ends may abut.

I claim—

As an article of manufacture, the herein-described perch-iron, consisting of the bar A, constructed with the straps B B diverging from the rear end of the said bar in a plane substantially parallel therewith, but above the top of said bar, and with an upward extension, $d$, to form a shoulder against which the wood portions of the perch may abut, substantially as described.

WM. H. COOPER.

Witnesses:
 JOHN E. EARLE,
 JOS. C. EARLE.